United States Patent
Zimmerman

(10) Patent No.: US 12,529,218 B2
(45) Date of Patent: Jan. 20, 2026

(54) LEVITATED DRAIN STOPPER

(71) Applicant: Brian Zimmerman, Orem, UT (US)

(72) Inventor: Brian Zimmerman, Orem, UT (US)

( * ) Notice: Subject to any disclaimer, the term of this patent is extended or adjusted under 35 U.S.C. 154(b) by 265 days.

(21) Appl. No.: 18/331,980

(22) Filed: Jun. 9, 2023

(65) Prior Publication Data

US 2024/0410149 A1    Dec. 12, 2024

(51) Int. Cl.
*E03C 1/23*    (2006.01)

(52) U.S. Cl.
CPC ........ *E03C 1/23* (2013.01); *E03C 2001/2311* (2013.01)

(58) Field of Classification Search
CPC ..... E03C 1/23; E03C 2001/2311; E03C 1/262
USPC ............................. 4/295, 286, 287, 668, 671
See application file for complete search history.

(56) References Cited

U.S. PATENT DOCUMENTS

| | | | |
|---|---|---|---|
| 802,952 A | 10/1905 | Waterman | |
| 3,183,934 A * | 5/1965 | Miner | F16K 31/52408 251/259 |
| 3,333,815 A * | 8/1967 | Jones | E03C 1/2306 251/74 |
| 3,652,054 A * | 3/1972 | Layton | F16K 31/0651 251/65 |
| 4,785,526 A * | 11/1988 | Koyama | G11B 5/127 29/603.16 |
| 7,459,909 B2 * | 12/2008 | Yao | G01R 33/3806 324/318 |
| 9,352,331 B1 * | 5/2016 | Lee | B03C 1/286 |
| 9,409,265 B2 * | 8/2016 | Whitesides | B03C 1/288 |
| 9,518,383 B2 * | 12/2016 | Lesmeister | E03C 1/264 |
| 10,753,186 B1 * | 8/2020 | Zimmerman, Jr. | E21B 43/13 |
| 11,421,408 B1 * | 8/2022 | Rosario | E03C 1/262 |
| 11,754,642 B2 * | 9/2023 | Moriya | G01R 33/091 335/296 |
| 12,161,328 B2 * | 12/2024 | Shelton, IV | A61B 17/072 |
| 12,163,326 B1 * | 12/2024 | Grumbach | C02F 3/342 |
| 2010/0154114 A1 * | 6/2010 | Van Zeeland | E03C 1/23 4/689 |
| 2019/0194953 A1 * | 6/2019 | McNinch | E04D 13/08 |
| 2022/0042292 A1 * | 2/2022 | Ahuja | A47K 1/14 |
| 2022/0325511 A1 * | 10/2022 | Rosario | E03C 1/264 |
| 2023/0404352 A1 * | 12/2023 | Clouse | G05D 1/648 |

(Continued)

FOREIGN PATENT DOCUMENTS

| | | | | |
|---|---|---|---|---|
| CN | 108580030 A | * | 9/2018 | ............... B03C 1/00 |
| DE | 69737997 T2 | * | 4/2008 | ......... G01R 33/3808 |

(Continued)

*Primary Examiner* — Lori L Baker
(74) *Attorney, Agent, or Firm* — R. William Graham

(57) ABSTRACT

A stopper mechanism for a drain includes one of a magnetic stopper and a diamagnetic and a magnetic field generator with a fixed position in relation to the drain which produces a magnetic field having a precise combination of position, geometry, and strength to support the stopper in a stable, levitated, distal position with relation to a drain to permit fluid and waste to pass by the stopper and which does not provide any contact points for collection of debris thereon, and wherein the magnetic field can be changed to cause the magnetic stopper to engage the drain to restrict flow through the drain. The application of the electromagnetic levitation principles creates a truly "clogless" drain mechanism.

5 Claims, 4 Drawing Sheets

(56) References Cited

U.S. PATENT DOCUMENTS

2024/0050660 A1\* 2/2024 Peyman ............. A61K 47/6929
2025/0075480 A1\* 3/2025 Ahuja ................... E03C 1/2302

FOREIGN PATENT DOCUMENTS

| EP | 1800753 B1 \* | 3/2011 | ................ B03C 1/01 |
| ES | 2958241 T3 \* | 2/2024 | ................ E03C 1/23 |
| TW | 202445300 A \* | 11/2024 | ........... F16K 15/023 |
| WO | WO-2012088119 A2 \* | 6/2012 | ................ B03C 1/01 |
| WO | WO-2018038708 A1 \* | 3/2018 | ........... F16D 57/002 |

\* cited by examiner

LEVITATED DRAIN STOPPER

FIELD OF INVENTION

This invention relates to drain stoppers, and more particularly to levitated drain valves or stoppers. The present invention has for its object the provision of improved and novel means for opening and closing a drain by the employment of a clog free electromagnetic stopper mechanism.

PRIOR ART

Various prior stopper mechanisms exist with respect to sink drains. These historically include the combination of mechanical connections to a stopper which extends through a drainpipe to actuate the stopper from an open to a closed position. Some of the prior devices employ magnets in combination with mechanical or manual means to move the stopper between the closed and open position.

For example, U.S. Pat. No. 802,952 discloses the combination with a reciprocating stopper and stopper stem, a rotary cam-wheel having depressions arranged in alternation at varying distances from the center of rotation, the stopper-stem cooperating with the cam-wheel, and an electromagnet for turning the cam-wheel, a spring adapted to close said stopper, a cam-wheel having elevations and depressions arranged in alternation, the stopper-stem resting on the cam-wheel, a ratchet-wheel connected to the cam-wheel, an electromagnet, a spring-pressed armature controlled by the electromagnet, and a pawl controlled by the armature and adapted for operating the ratchet-wheel, the electromagnet being adapted on alternate energizations to open and close the stopper. This is a relatively complicated and expensive mechanism.

U.S. Pat. No. 9,518,383 discloses a drain stopper assembly for a bathtub having a drain aperture, and a method for using the assembly. A guide rod may be slid within a guide slide, allowing a gasket to be sealed or unsealed against the drain aperture. Magnets or, alternatively, a spring-loaded mechanism, may be used to facilitate sealing/unsealing of the gasket. A filter may be mounted within the drain aperture and be removably or permanently attached to the assembly. This requires manual interaction with the drain stopper itself not unlike conventional stoppers.

There is a need for improvement in the field of drain stoppers which delivers a more user-friendly experience and aids in preventing clogging of debris within the drain. The instant invention addresses these needs.

SUMMARY OF THE INVENTION

It is an object to improve drain stoppers.
It is a further object to reduce drain clogs.
A further object is to improve the user experience with interaction of drain stoppers within a vessel.
Another object is to enhance the utility of the sink with an automated stopper which minimizes the need for a user to physically touch with the stopper to actuate the same between the open to closed positions.

Accordingly, the invention is directed to an electromagnetic stopper mechanism which maintains a stopper in an open position through an electrically powered charge thus suspending the stopper out of contact with a part of the sink and permitting fluid and waste flow about the stopper in an unobstructed manner and can be actuated by a switch to a closed position of the stopper thus placing the stopper in blocking contact with a drain of the sink.

One aspect of the invention provides a method for supporting a stopper within a drain of a sink, including providing a stopper having a head with a perimeter seal and a part of which is one of magnetic and diamagnetic, and arranging a magnetic field to support the stopper in a stable position with relation to the drain to permit fluid and waste to pass by the stopper in an unobstructed manner, whereby the magnetic field may be actuated to cause the head perimeter seal to engage the drain to restrict flow through the drain.

Another aspect of the invention is a magnetic support mechanism which includes a magnetic field arranged to support either a magnetic stopper or a diamagnetic stopper in a stable noncontact position with relation to a drain and a vessel whereby the stopper may be moved by remote actuation of the magnetic field to engage the stopper with the drain to restrict flow there between. This mechanism is a novel concept because it does not have any points of contact with the sink or drainpipe. The levitated electromagnetic drain stopper mechanism does not provide any points of contact where hair or other materials can be caught or retained in the drain and lead to an eventual clog.

Another aspect of the invention is directed to a stopper including one of a magnetic material and diamagnetic material and a magnetic field generator with a fixed position in relation to the drain which produces a magnetic field having a precise combination of position, geometry, and strength to support the stopper in a stable distal position with relation to the drain to permit fluid and waste to pass by the stopper and which does not provide any interconnecting structure to the stopper within the drain for collection of debris thereon, whereby the magnetic field can be changed to cause the stopper to engage the drain to restrict flow through the drain.

The invention is designed more particularly for use in connection with vanities, lavatories and bathtubs, but is not necessarily confined to such uses. Having the foregoing objects in view, the invention embraces certain improvements set forth fully hereinafter and embodied in the appended claims.

DETAILED DESCRIPTION OF THE PREFERRED EMBODIMENT

Figure 1:
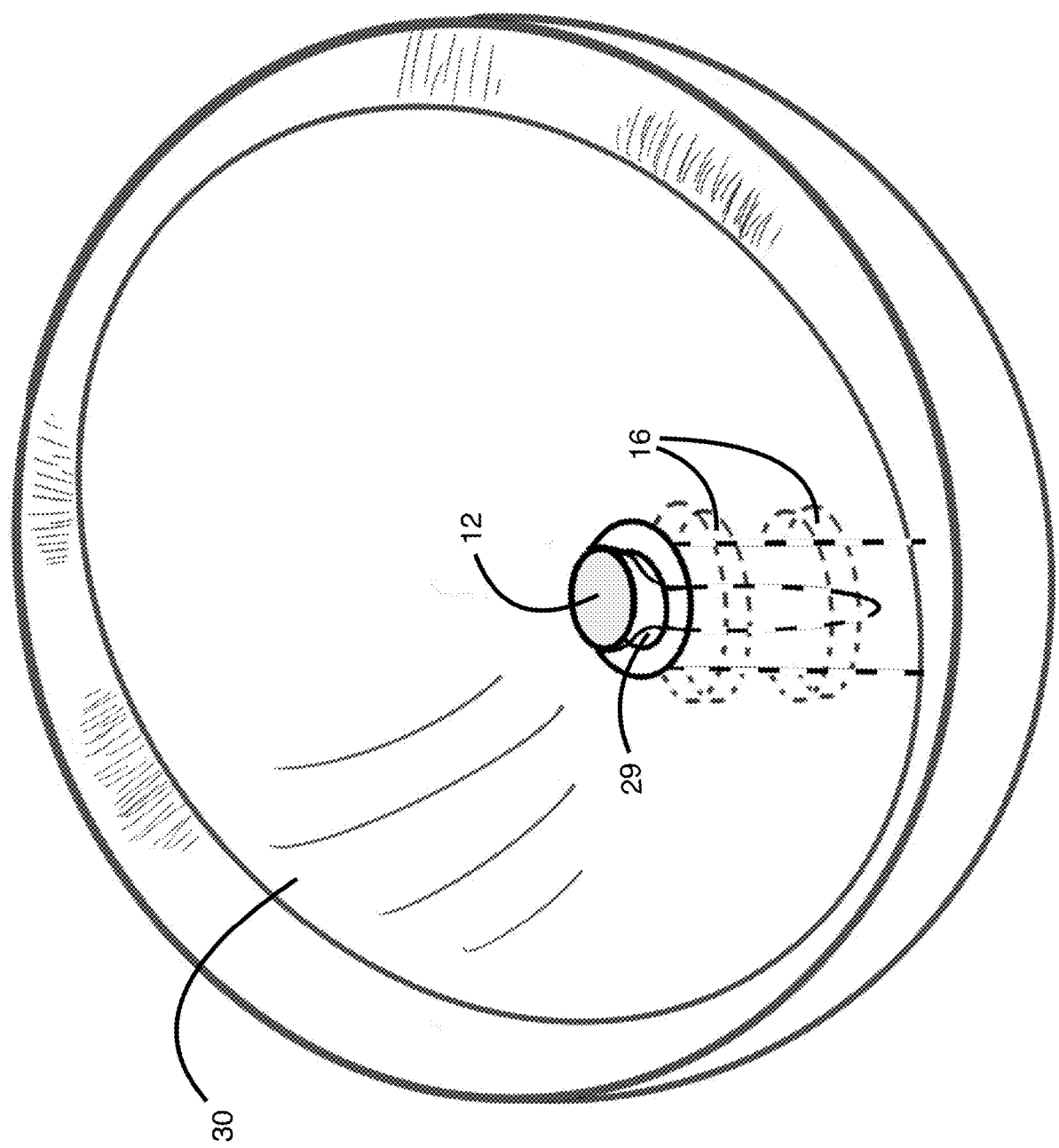
FIG. 1 is a perspective view of the invention.
Figure 2:
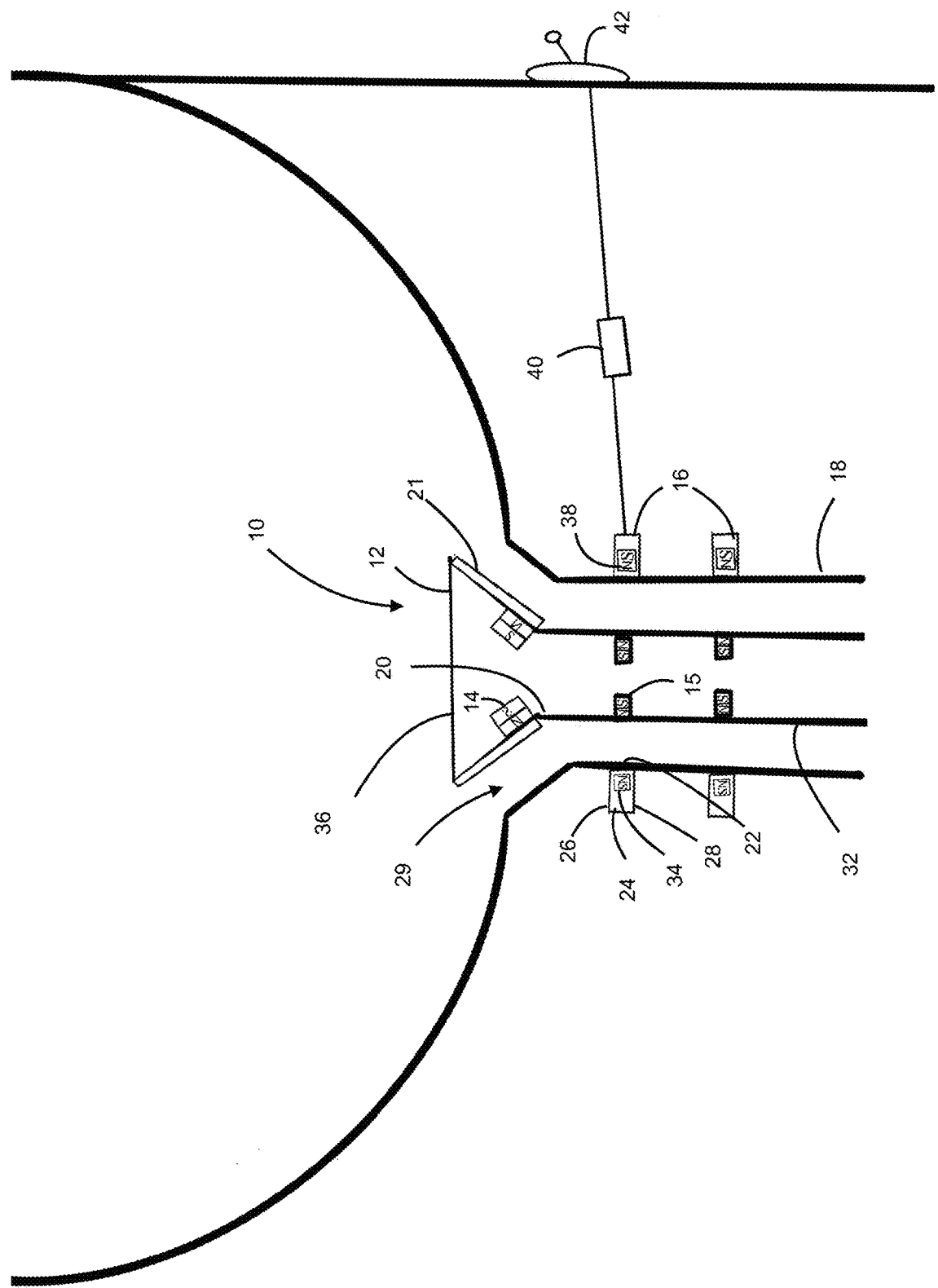
FIG. 2 is a sectional elevation in an open position.
Figure 3:
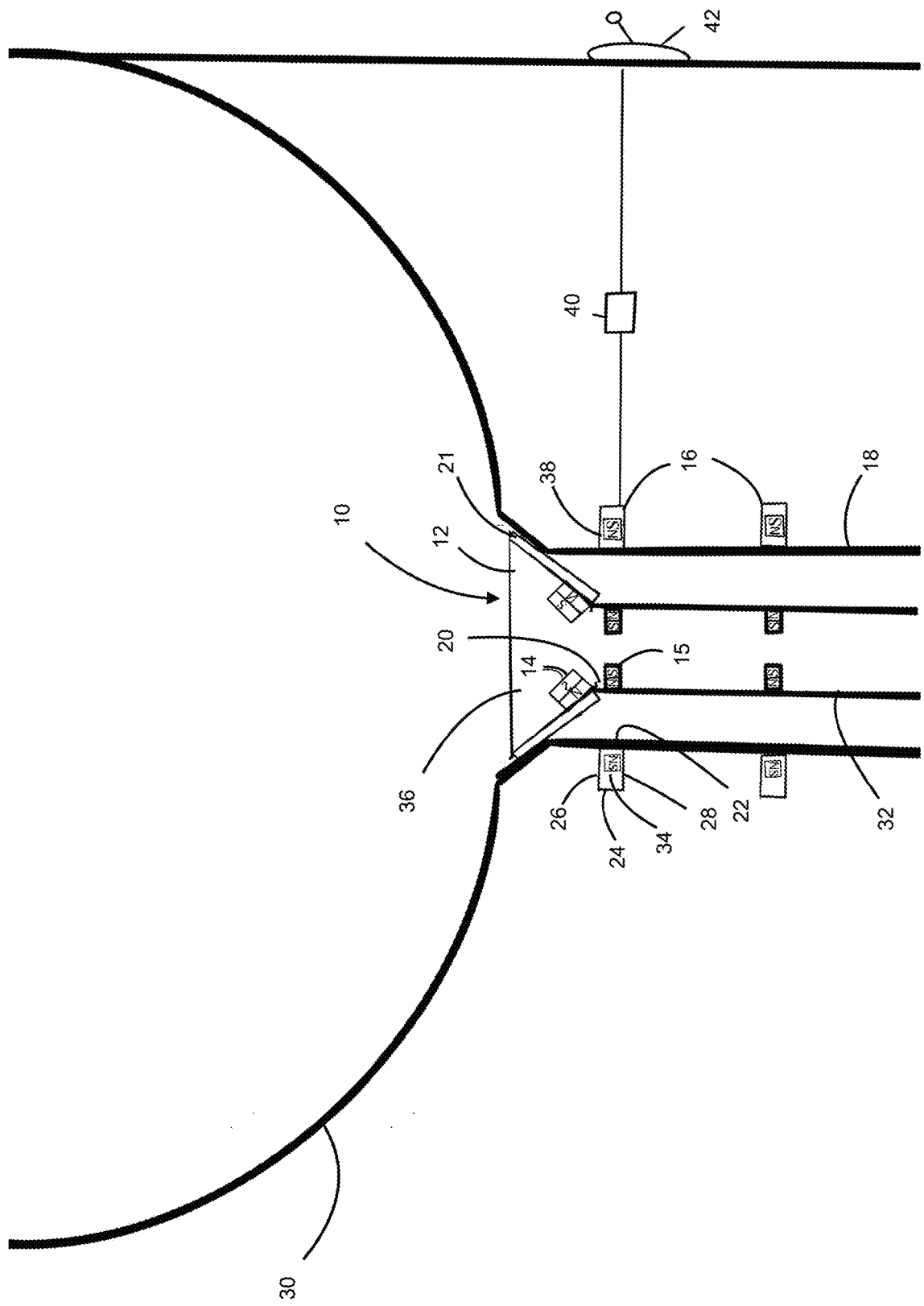
FIG. 3 is a section elevation in a closed position.
Figure 4:
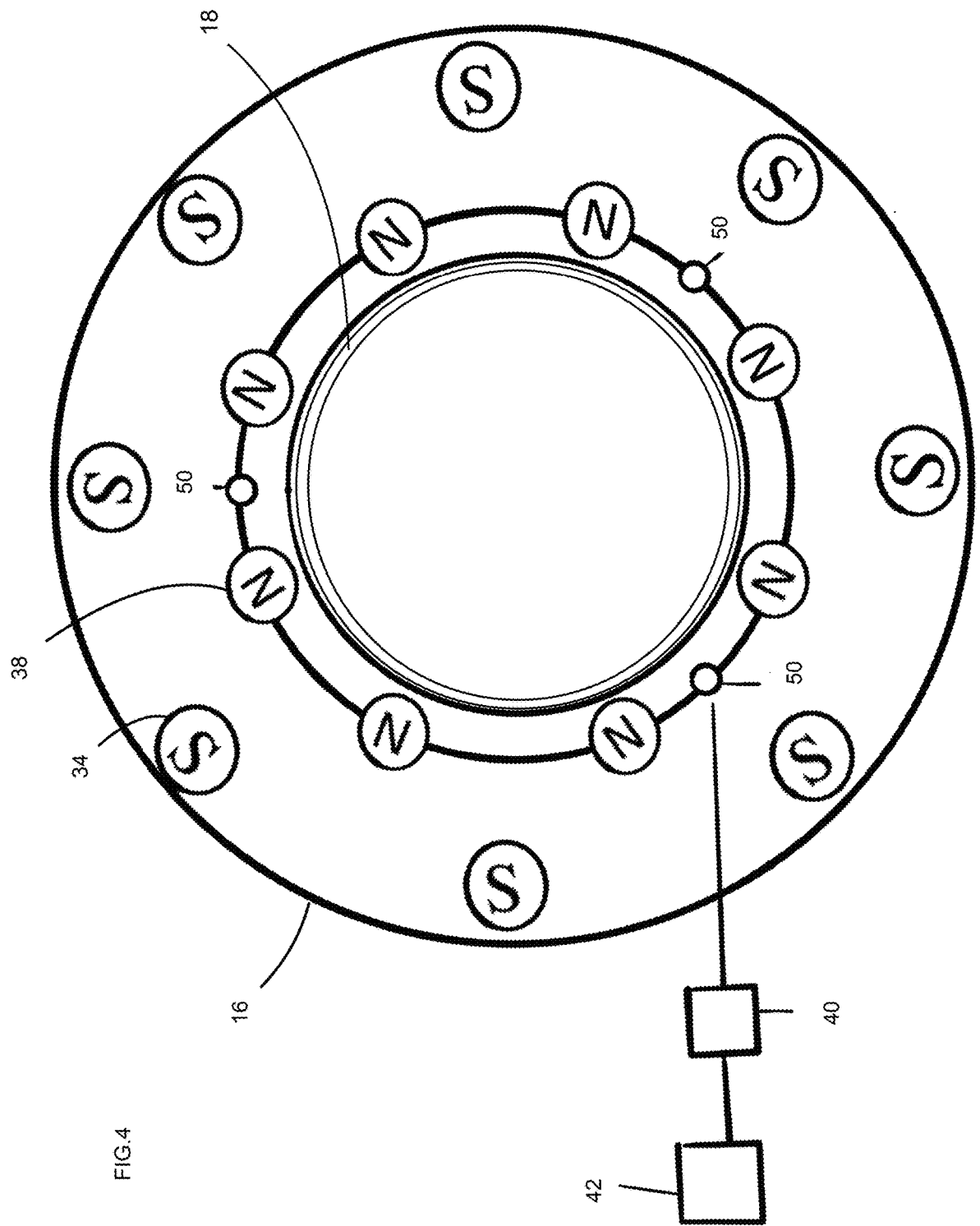
FIG. 4 shows a ring magnet with a radially oriented magnetic field.

An electromagnetic stopper mechanism of the instant invention is generally designated by the numeral 10. The stopper mechanism 10 includes a stopper 12 having one or more magnetic or diamagnetic part 14, 15 and magnetic field generating component 16. In one case, this can be a magnet field generator 16 concentrically affixed to about a drain 18 somewhere adjacent connection to an opening 29 in vessel 30 (such as a sink) and near where a neck 20 of stopper 12 would normally be disposed. The stopper 12 can preferably include a rubber seal, such as a thermoplastic rubber seal member 21 for use closing the flow to the drain 18.

The magnetic field generator 16 can have a housing structure with an inner cylindrical surface 22, an outer cylindrical surface 24, and upper surface 26 and a lower surface 28. The outer surface 24 and or lower surface 28 can include or be comprised of magnetic shielding material if so desired. The magnetism of magnetic field generator 16 is oriented radially or concentrically about the drain 18, as shown in the drawings. Note, the orientation of the internal magnetic field generating component 34 can be configured arranging a magnetic field relative to the magnetic/diametric part 14, 15 to support the stopper 12 in a stable position with relation to the drain 18 of sink 30 to permit fluid and waste to pass by a stem 32 of stopper 12 and wherein there is no interconnecting structure to the stem 32 for collection of debris thereon. The magnetic field may be changed to cause the stopper perimeter seal 21 to engage the sink 30 and/or drain 18 to restrict flow therethrough.

Inner cylindrical surface 22 is shown to face the drain 18 and can be affixed by various means, for example, the inner surface 22 can be configured of a diameter to friction fit about the drain 18 or via adhesive or other suitable means. Optionally, in a case of the magnetic field generator 16 including multiple components, such as arcuate-shaped components, then these components can be interconnected and maintained by means of a band or other suitable means.

As seen in the example, there can be operatively disposed one or more permanent magnetic 34 and electromagnet 38 in the magnetic field generator 16 for generating a pole, e.g., north, between upper surface 26 and inner surface 22 and pole, e.g., south, between lower surface 28 and outer cylindrical surface 24 or vice a versa. In this regard, magnetic field generator 16 may be formed from a single piece or composed of a number of separate pieces, each of which is mounted with its magnetic field aligned to achieve the intended result.

A stem 32 as seen in the Figures is centrally disposed with stopper head 36 centrally disposed above the drain 18. Stem 32 and head 36 can have similar properties as a typical stopper 16 with the addition of the embedded magnetic and diamagnetic elements.

The particular orientation of the magnetic generating member 34 relative to a particular part of the stopper head 36 and stem 32 is be configured in relation to the associated magnetic field generating component 16 in order to maintain the stopper 12 in a levitated state. The magnetic field generating component 16 can preferably employ stable magnetic levitation for example by electromagnetic suspension (EMS) and can be achieved by obtaining a desired position of the magnetic stopper 12 relative to the vessel 30 and drain 18 and the properties of the magnetic stopper 12 including its weight and factoring against gravity to being levitated. Using a feedback loop in a circuit 40 to continuously adjusts one or more electromagnets 38 there is provided correction of the motion of the stopper 12, thus a servomechanism is provided. Ratiometric Hall-Effect sensor(s) 50 or other sensor known to the art can be used to measure the position of the stopper 12. In order to control the electromagnets properly, the device needs a way of accurately sensing the position of the floating magnets 14 and 15. It needs to notice the tiniest change in position so that it can react quickly.

In this device, several ratiometric Hall-Effect sensors 50 can be used. Hall-Effect sensors are essentially on/off switches. If they "see" a magnetic field that's above a certain strength, they switch on. The ratiometric sensors 50 used here are tiny chips which supply a voltage that varies with the strength of the magnetic field it sees. If the magnetic field gets stronger, the voltage goes up. They sense tiny changes in magnetic field strength.

These sensors 50 located at the center of the magnetic field generating component 16. They are oriented to sense the magnetic field in each direction: up and down, left and right, fore and aft. The readings from these sensors 50 provide enough information about the height and position of the floating magnet 14 in stopper 12. When the floating stopper tips off to the side, Sensors 50 sense it from and turn on the right electromagnet to give it a correcting push.

The magnetic field generating component 16 is turned off/on whenever the stopper 12 gets to close or far from the desired position. A switch 42 feeding electrical current to the magnetic field generating component 16 is provided at a remote location, e.g., outside of a vanity or on a wall, and when the power is off, the stopper 12 can drop by gravity into sealing position in the drain 18 to restrict fluid flow. It is also envisioned, the switch 42 can cause a reverse polarity and draw the stopper 12 into sealed position with the drain 18. By switching the power back, the stopper 12 is automatically repositioned to a levitated state. This system does not violate Earnshaw's theorem because it's not using some number of permanent (always on) magnets to hold up the floating stopper 12 with its magnets 14. It has actively controlled magnets that are switched on and off, responding to mis-alignment and correcting the instability. Thus, there is provided an electro-magnetic suspension.

While magnetic material can be employed in the stopper 12, it is contemplated that a form of levitation can employ diamagnetism wherein the stopper 12 is comprised of a material property which causes it to create a magnetic field in opposition to an externally applied magnetic field of the magnetic field generating component 16, thus causing the material to be repelled by magnetic fields. A conductor in the stopper 12 can be levitated above the magnetic field generating component 16 with an alternating current flowing through it. This causes any regular conductor to behave like a diamagnet, due to the eddy currents generated in the conductor. Since the eddy currents create their own fields which oppose the magnetic field, the conductive stopper 12 is repelled from the magnetic field generating component 16.

The levitation shown in FIG. 1 in the hole of drain 18 is governed by the magnetic field generator 16 orientation. This occurs because magnets (or diamagnetic material) 14, 36 are repelled by magnetic field generator 16. Because of the shape of magnetic field generator 16, the repulsive magnetic forces on stopper 12 are substantially radial. If cross section is not in the exact center of magnetic field generator 16, the repulsive magnetic forces may also be slightly off center. Gravity is counterbalanced by the repelling force from the magnetic field generator 16. Thus, magnetic field generator 16 affixed to drain 18 forms a magnetic support assembly.

By so providing, there is an improved stopper 12 which through levitation, enables maintaining a stopper 12 in an open position through an electrically powered charge and permitting fluid and waste flow about the stopper 12 in an unobstructed manner about the stopper 12 and to a closed position through actuation of the power and wherein there is not provided any interconnecting structure to the stopper 12 within the drain 18 for collection of debris thereon. The following claims are not to be limited by the structure disclosed but are illustrative of the invention and modifications, improvements and derivations are intended to be within the scope afforded by the claims hereinafter.

What is claimed is:

1. A method for supporting a stopper within a drain of a sink, comprising: providing a stopper having a head with a perimeter seal and a part of which is one of magnetic and diamagnetic, and arranging a magnetic field to support said stopper in a stable position with relation to the drain to permit fluid and waste to pass by said stopper in an unobstructed manner, whereby said magnetic field is actuated to cause said head perimeter seal to engage the drain to restrict flow through the drain, wherein arranging a magnetic field comprises placing magnetic shielding material to shape the magnetic field.

2. The method of claim 1, wherein arranging said magnetic field comprises arranging a substantially concentrically oriented magnetic field about said stopper.

3. The method of claim 1 wherein arranging said magnetic field comprises arranging arcuate shaped parts about the drain.

4. A magnetic support mechanism, comprising:
a magnetic field arranged to support one of a magnetic stopper and a diamagnetic stopper in a stable non-contact position with relation to a drain and a vessel whereby said one of magnetic stopper and said diamagnetic stopper may be moved by remote actuation of said magnetic field to engage said one of magnetic stopper and said diamagnetic stopper with the drain to restrict flow there between, wherein said magnetic field comprises a arcuate shaped parts about the drain.

5. A magnetic support mechanism, comprising:
a magnetic field arranged to support one of a magnetic stopper and a diamagnetic stopper in a stable non-contact position with relation to a drain and a vessel whereby said one of magnetic stopper and said diamagnetic stopper may be moved by remote actuation of said magnetic field to engage said one of magnetic stopper and said diamagnetic stopper with the drain to restrict flow there between, which further includes magnetic shielding material.

\* \* \* \* \*